(12) United States Patent
Dinh

(10) Patent No.: US 7,179,995 B2
(45) Date of Patent: Feb. 20, 2007

(54) STUD SNAP & LOCK NON-METALLIC ELECTRICAL BOX

(75) Inventor: Cong Thanh Dinh, Collierville, TN (US)

(73) Assignee: Thomas & Betts International, Inc., Wilmington, DE (US)

( * ) Notice: Subject to any disclaimer, the term of this patent is extended or adjusted under 35 U.S.C. 154(b) by 0 days.

(21) Appl. No.: 11/447,570

(22) Filed: Jun. 6, 2006

(65) Prior Publication Data

US 2006/0272841 A1 Dec. 7, 2006

Related U.S. Application Data

(60) Provisional application No. 60/688,256, filed on Jun. 7, 2005.

(51) Int. Cl.
*H01H 9/02* (2006.01)
(52) U.S. Cl. .............. 174/58; 174/61; 174/63; 174/48; 248/906; 220/3.8
(58) Field of Classification Search ............ 174/58, 174/61, 63, 54, 48; 220/3.2, 3.7, 3.8, 3.92; 248/300, 906, 205.1
See application file for complete search history.

(56) References Cited

U.S. PATENT DOCUMENTS

| | | |
|---|---|---|
| 2,586,728 A | 2/1952 | Shepard |
| 2,665,865 A | 1/1954 | Bell |
| 3,097,821 A | 7/1963 | Richards |
| 3,360,151 A | 12/1967 | Yznaga |
| 3,474,994 A | 10/1969 | Swanquist |
| 3,588,019 A | 6/1971 | Cozeck et al. |
| 3,720,395 A | 3/1973 | Schuplin |
| 3,730,466 A | 5/1973 | Swanquist |
| 3,780,209 A | 12/1973 | Schuplin |
| 3,963,204 A | 6/1976 | Liss |
| 3,977,640 A | 8/1976 | Arnold et al. |
| 4,108,414 A | 8/1978 | Grant, Sr. |
| 4,140,293 A | 2/1979 | Hansen |
| 4,226,393 A | 10/1980 | Rardin et al. |
| 4,362,284 A | 12/1982 | Bolante |
| 4,447,030 A * | 5/1984 | Nattel .............. 248/27.1 |
| 4,483,453 A | 11/1984 | Smolik |
| 4,693,438 A | 9/1987 | Angell |
| 4,747,506 A | 5/1988 | Stuchlik, III |
| 4,874,334 A | 10/1989 | Golden |
| 4,971,280 A | 11/1990 | Rinderer |
| 5,004,199 A | 4/1991 | Suk |
| 5,239,132 A | 8/1993 | Bartow |
| 5,408,045 A | 4/1995 | Jorgensen et al. |
| 5,677,512 A | 10/1997 | Reiker |
| 5,841,068 A * | 11/1998 | Umstead et al. .......... 174/58 |

(Continued)

*Primary Examiner*—Dhiru R. Patel
(74) *Attorney, Agent, or Firm*—Hoffmann & Baron, LLP

(57) ABSTRACT

The invention pertains to an electrical box assembly having a support structure for use in securing electrical enclosures, housings or boxes or the like to a stud. Upon insertion of the stud into a stud-receiving cavity of the assembly, a movable tab is pivoted to press one or more prongs into engagement with the stud. Pivoting of the tab may continue until the tab is locked in place whereupon the electrical enclosure is secured to the stud in compliance with code requirements without the need for such secondary operations as driving a separate fastener into the stud; the box now being secured with sufficient rigidity to satisfy local code enforcement.

20 Claims, 3 Drawing Sheets

U.S. PATENT DOCUMENTS

| | | | |
|---|---|---|---|
| 6,198,045 B1 * | 3/2001 | Roesch | 174/58 |
| 6,207,898 B1 | 3/2001 | Reiker | |
| 6,389,658 B1 | 5/2002 | Pfaller et al. | |
| 6,484,979 B1 | 11/2002 | Medlin, Jr. | |
| 6,484,980 B2 | 11/2002 | Medlin, Sr. et al. | |

* cited by examiner

STUD SNAP & LOCK NON-METALLIC ELECTRICAL BOX

CROSS-REFERENCE TO RELATED APPLICATIONS

This application claims the benefit of U.S. Provisional Patent Application Ser. No. 60/688,256 filed on Jun. 7, 2005.

FIELD OF THE INVENTION

The present invention generally relates to an electrical enclosure, housing or assembly supported from a stud and, more particularly, to a bracket affixed to the enclosure or assembly that once applied to the stud, requires no further operation, installation or hardware to meet industry codes.

BACKGROUND OF THE INVENTION

Electrical enclosures, frames, housings, boxes or the like are quite common and are extensively used to support fixtures to which high and low voltage wires are terminated. Examples of such fixtures are switches, duplex receptacles, Ground Fault Circuit Interrupters (GFCIs), telephone jacks, cable connections and other power or communication devices. Such enclosures supporting these fixtures are not free-standing and thus require support within the building structure if they are to be installed in accordance with local or national industry codes. These codes often specify a certain loading or series of forces the enclosure must withstand after being installed.

Perhaps the most common way of supporting such devices is via nails or screws inserted through openings in the device before being driven into a stud of the building. Other methods of securing electrical enclosures to a building include a separate elongated metal bracket that spans between adjacent studs or support members, the enclosure then being bolted or screwed to the bracket. Another method involves a metal or plastic bracket affixed to the box that is pushed onto or against a stud and then subsequently fastened in place via nails or screws.

As quick and simple as the above may appear, the operation of driving or fastening the nail or screw is still a secondary operation that must be completed after the device is initially positioned. This secondary operation requires time, some more than others, thus prolonging the process of securing the device to the stud in a manner that will comply with local requirements. Such secondary operations also reduce the number of boxes that can be installed in a given period of time.

To ease installation when it is known that a nail or screw is to be used, electrical outlet enclosures are oftentimes manufactured with the nail or screw being held captive on the device prior to installation. Thus, to cut down on the number of secondary steps required, the user need only drive the nail or screw home after the enclosure is positioned against the stud. However, care has to be taken to insure that the step of screwing or nailing does not move the enclosure out of position. Also, care has to be taken that this additional fastening hardware is not dropped or lost. Furthermore, the user has to be mindful of how the enclosure is held during the driving operation so that the step of swinging a hammer or installing a screw does not inadvertently result in personal injury or damage to the enclosure. Additionally, once the fastener is embedded into the stud, it becomes quite difficult to remove the enclosure or change its location if such becomes necessary.

Thus, it becomes desirable to avoid these secondary securement steps so that more devices can be installed in the same period of time. It is also desirable to dispense with these separate fasteners or screws as this only adds cost and another assembly step in the manufacture of the final product. Furthermore, such fasteners can be lost. Safety is also a factor as one injury can result in considerable and quite unexpected cost and delay. Another desirable feature is to have the device secured to the stud immediately after initial installation with no further operation required by the installer. Yet another desirable feature is a low cost box that can be secured as above while still complying with local codes and ordinances. These and other objects and advantages of this invention are described in greater detail below.

SUMMARY OF THE INVENTION

The invention pertains to an electrical box assembly having a support structure for use in securing electrical enclosures, housings or boxes or the like to a stud. Upon insertion of the stud into a stud-receiving cavity of the assembly, a movable tab is pivoted to press one or more prongs into engagement with the stud. Pivoting of the tab may continue until the tab is locked in place whereupon the electrical enclosure is secured to the stud in compliance with code requirements without the need for such secondary operations as driving a separate fastener into the stud; the box now being secured with sufficient rigidity to satisfy local code enforcement.

Various aspects of the assembly relate to supporting an electrical fixture from a stud. For example, according to one aspect of the invention, an electrical box assembly includes an electrical enclosure, a bracket affixed to the enclosure, the bracket defining a stud-receiving cavity extending along an edge of the enclosure, and a tab extending from the bracket and being movable between a stud-receiving position and a stud-securing position. The tab is adapted to include at least one prong that extends into the stud-receiving cavity when the tab is in the stud-securing position whereupon insertion of a stud into the cavity and movement of the tab to the stud-securing position engages the prong and thereby secures the enclosure to the stud.

In another aspect of the invention, a support structure for an electrical enclosure includes a bracket extending from a first surface of an electrical enclosure, the bracket having a first generally planar surface, a flange extending from the bracket, the flange having a generally planar surface defining a stud receiving cavity, and a tab for securing a stud in the stud-receiving cavity. The tab being movable between a stud-receiving position and a stud-securing position and adapted to include at least one prong that extends into the stud-receiving cavity when the tab is in the stud-securing position whereupon insertion of a stud into the cavity and movement of the tab to the stud-securing position engages the prong and thereby secures the enclosure to the stud.

Additional features and advantages will be readily apparent from the following detailed description, the accompanying drawings and the claims.

DETAILED DESCRIPTION OF THE PREFERRED EMBODIMENT

Figure 1:
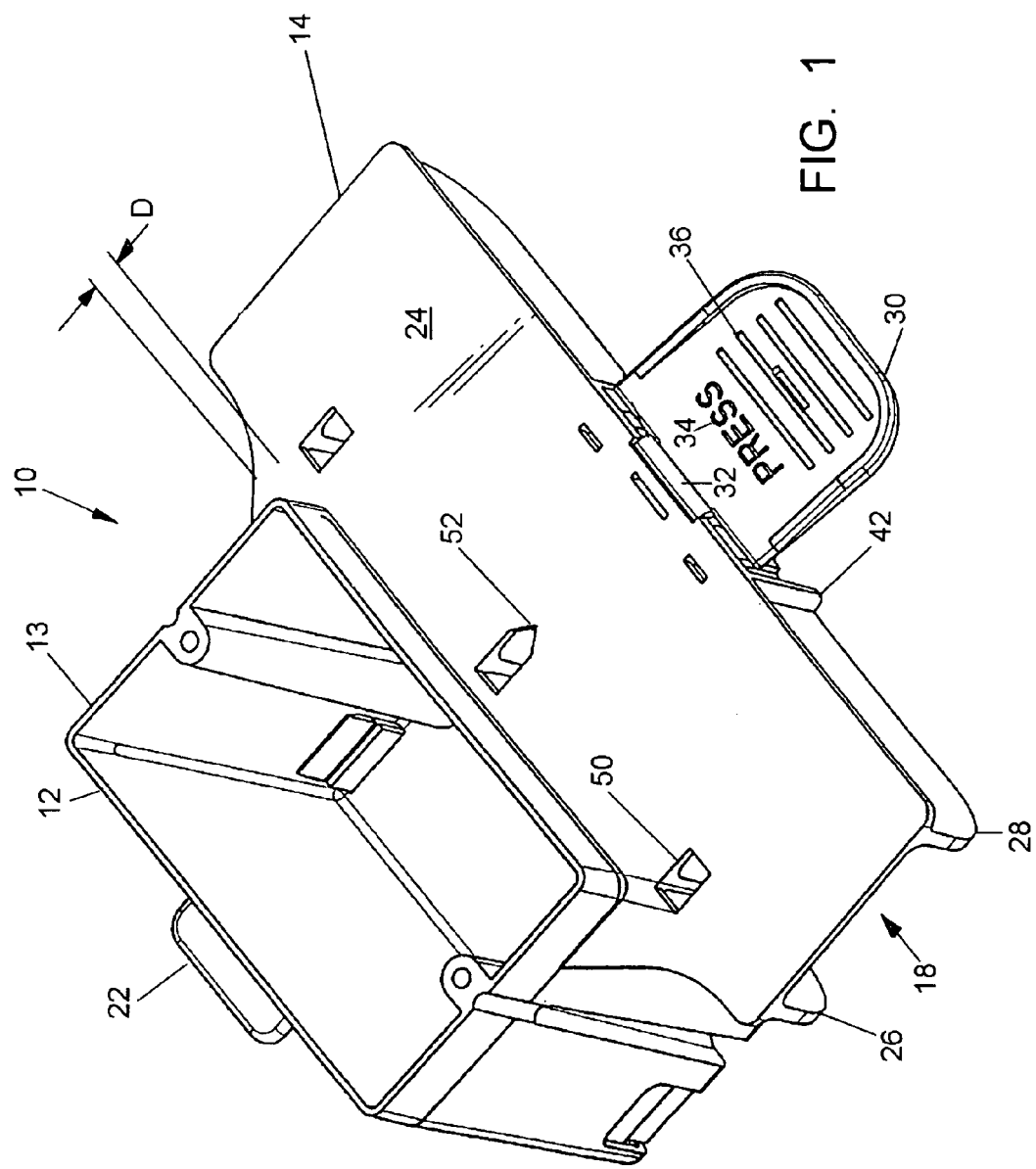
FIG. 1 is a front perspective view of the invention.

Referring now to FIG. 1, an electrical box assembly 10 is shown comprising an enclosure, i.e., a box 12, and a support structure, i.e., a bracket 14. It should be understood from the outset that the box 12 can comprise a single or a multiple gang outlet box. Also, box 12 can comprise a combo box or enclosure of the type shown in U.S. Pat. No. 6,727,428 wherein both a power connection and a low voltage connection can be made. Furthermore, the box 12 can comprise simply a low voltage frame similar to the low voltage frame shown and described in the above U.S. patent. Other structures are equally likely for the box 12 and are meant to be included herein.

Figure 2:
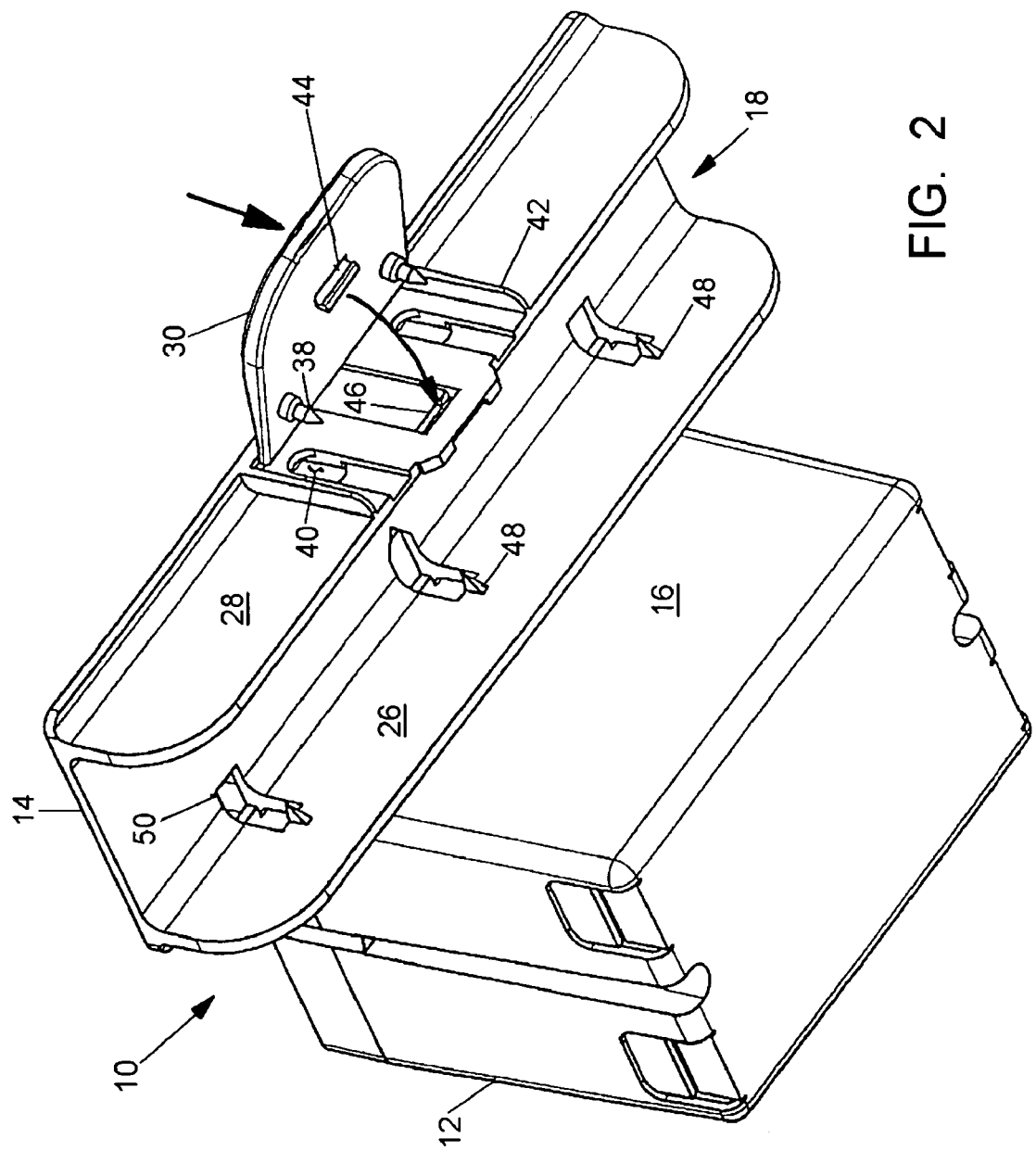
FIG. 2 is a rear perspective view of the invention.

Referring now to FIG. 2, in one preferred embodiment, the bracket 14 extends from a side 16 of the box 12 and defines a stud-receiving cavity 18. The bracket 14 is sized to allow a stud 20 to be inserted within the stud-receiving cavity 18. As best shown in FIG. 2, the stud-receiving cavity 18 is fully defined by the bracket 14. The present invention, however, is not limited to such an embodiment. For example, in an alternative preferred embodiment, the side 16 of the box 12 may define one side of the stud-receiving cavity 18.

Referring back to FIG. 1, the bracket 14 is preferably secured to one side of the box 12 and is recessed a distance D from an edge 13 so as to accommodate drywall or other wall covering that may surround the box 12. In one preferred embodiment, the bracket 14 has a generally planar top surface 24 to facilitate installation of drywall thereon.

In one preferred embodiment, box assembly 10 includes a drywall support 22 on the side of the box opposite the bracket 14. Support 22 is also spaced a distance D from edge 13 and also serves to brace drywall material (not shown) adjacent the front opening of the box 12.

Referring back to FIG. 2, forming a portion of the bracket 14 are a first flange 26 and a second flange 28 that extend perpendicular from the planar top surface 24. The flanges 26, 28 extend generally parallel to each other and to the side 16 of the box 12. As described previously, in one preferred embodiment, the flanges 26, 28 and the generally planar surface 24 of the bracket 14 define the stud-receiving cavity 18. Also, as described previously, an alternative embodiment of the present invention may eliminate the first flange 26 and form the stud-receiving cavity using the side 16 of the box 12. The rigidity of the interconnection between the flange 28 and the planar surface 24 may be further enhanced by employing stiffeners 42.

Figure 3:
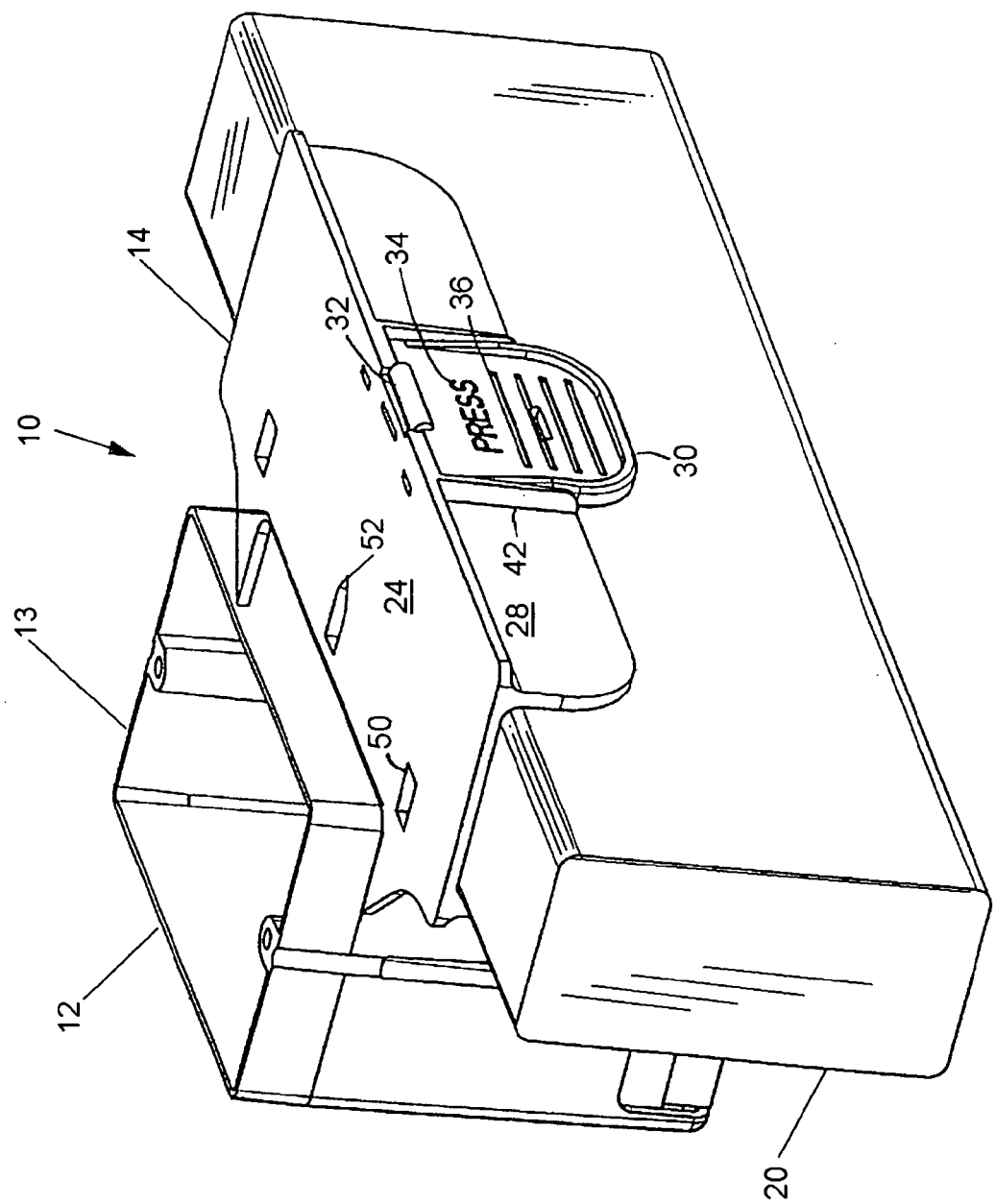
FIG. 3 is a side perspective view of the invention shown secured to a stud.
Like reference symbols in the various drawings indicate like elements.

As shown in FIGS. 2 and 3, in one preferred embodiment, the second flange 28 is configured with a pivotal tab 30 that pivots about a hinge 32. The hinge 32 may be formed from a thin strip of the same material from which the box assembly 10 is constructed. Preferably, the tab 30 is located along a mid-region of the bracket 14 and is designed for easy operation by the user.

Referring back to FIG. 1, the upper surface of the tab 30 includes indicia 34 that aids the user in the operation of the assembly 10 and instructs the user to press or pivot the tab 30 about the hinge 32. Preferably, the upper surface of the tab 30 includes one or more ribs 36 that allow for better gripping of the tab 30 by the user.

The underside of the tab 30 is shown in FIG. 2 and is configured with one or more prongs 38 that extend from the tab 30 and into the stud-receiving cavity 18 upon pivoting the tab 30 about the hinge 32. Of course, it will be appreciated by one skilled in the art that the actual number and type of prongs 38 configured on the tab 30 may be varied. For example, teeth, nails, rivets, and pins may be used as prongs.

The prongs 38 of the present invention are adapted to extend through respective openings 40 in the flange 28 and to engage and bias against a stud 20 upon pivoting the tab 30 from a stud-receiving position to a stud-securing position. FIGS. 1 and 2 show the tab 30 in the stud-receiving position and FIG. 3 shows the tab 30 in the stud-securing position. In one preferred embodiment, the prongs 38 are caused to bite into the stud 20 upon movement of the tab 30 to the stud-securing position. As shown in FIG. 3, upon insertion of the stud 20 into the stud-receiving cavity 18 and movement of the tab 30 to the stud-securing position, the prongs 38 engage the stud and thereby secures the assembly to the stud.

The underside of the tab 30 is configured with a locking member 44 that latches with a corresponding catch 46 in the flange 28 to further secure the tab 30 in the stud-securing position. Of course, if desired, the locking member 44 may be formed in the flange 28 and the catch 46 may be formed in the tab 30. The locking member 44 and catch 46 may vary from that shown in the drawings, and other fastening techniques for further securing the tab 30 in the stud-securing position may be used.

In one preferred embodiment, referring to FIG. 2, the first flange 26 includes one or more teeth 48 that extend into the stud-receiving cavity 18. The one or more teeth 48 are configured to grip the stud 20 from the opposite side of the tab 30 upon movement of the tab 30 to the stud-securing position. As a result, the stud 20 is engaged by both the first and second flanges 26, 28, respectively. The amount by which prongs 38 and teeth 48 extend into the stud receiving cavity 18 is a matter of design choice with such factors as the force required to fully lock the tab 30 in the stud-securing position being one item to be considered in that determination.

In one preferred embodiment, the assembly 10 is molded using a conventional plastic material. Preferably, openings 50 are provided to allow the assembly 10 to be removed from the mold. Likewise, other methods of manufacture may be employed to create the assembly 10 other than molding. For example, a metal assembly or a combination of metal and plastic (i.e., two or more pieces) may be used to form the assembly 10.

The box assembly 10 may also include an alignment guide 52 that assists a user in positioning the stud 20 in the stud-receiving cavity 18. Various types of alignment guides may be configured for the box assembly 10. For example, the alignment guide 52 can take the form of a line, a marker, a slot, or an opening on the generally planar surface 24 of the bracket 14.

In operation, a user will note the location of where the box assembly 10 is to be secured to the stud 20 so that it may be properly placed thereon without the need for re-alignment once installed. Typically, prior to installation of the box assembly 10, the stud 20 is marked not only as to the height of the box 12 on the stud 20, but also whether the box 12 is to be a single gang box, a multi-gang box, a combination box supporting both power and low voltage fixtures or simply a low voltage frame. Once the location and type of box assembly 10 is established, the user, using the alignment guide 52, installs the box assembly 10 by inserting the stud 20 within the stud receiving cavity 18. Once fully inserted, the user then pivots the tab 30 to the stud-securing position to force the one or more prongs 38 against a side of the stud 20. Pivoting of the tab 30 to the stud-securing position also embeds the one or more teeth 48 into the opposite side of the stud 20. The pivoting of the tab 30 may continue until the locking member 44 engages the catch 46. Once the tab 30 is locked in place, the resulting bias or pinching applied to the stud 20 adequately supports the box 12 so as to be in compliance with local and national code requirements.

Those skilled in the art will appreciate that several benefits result from the present design. The user no longer needs to perform additional installation or fastening steps since the resulting bias or pinching of the stud 20 occurs automatically upon pivoting of the tab 30. This results in increased user productivity as time needed to install secondary fasteners into the stud 20 can instead be used to install additional box assemblies 10. Furthermore, no nailing or screwing is required to bring the box 12 in compliance with local or national code with respect to load bearing.

Although preferred embodiments of the present invention have been described herein with reference to the accompanying drawings, it is to be understood that the invention is not limited to those precise embodiments and that various other changes and modifications may be affected herein by one skilled in the art without departing from the scope or spirit of the invention, and that it is intended to claim all such changes and modifications that fall within the scope of the invention.

What is claimed is:

1. An electrical box assembly for mounting to a stud comprising:
    an electrical enclosure;
    a bracket affixed to said enclosure, said bracket defining at least a portion of a stud-receiving cavity extending along an edge of said enclosure; and
    a tab pivotally connected to said bracket and movable between a stud-receiving position wherein said tab is pivoted away from said cavity and a stud-securing position wherein said tab is pivoted toward said cavity such that said tab is substantially coplanar with the edge of said stud, and wherein said tab includes at least one prong that extends into said stud-receiving cavity for engaging said stud.

2. The electrical box assembly of claim 1, wherein said tab pivotally connected to said bracket comprises a hinge for pivoting said tab with respect to said bracket.

3. The electrical box assembly of claim 1, wherein said tab comprises a locking member for locking said tab in said stud-securing position.

4. The electrical box assembly of claim 1, further comprising at least one flange extending generally orthogonal to a planar surface of said bracket and forming a perimeter portion of said stud-receiving cavity.

5. The electrical box assembly of claim 4, further comprising at least one stiffener between said planar surface and said at least one flange to resist deflection of said flange with respect to said planar surface upon movement of said tab between said stud-receiving position and said stud-securing position.

6. The electrical box assembly of claim 4, further comprising a pair of flanges extending generally orthogonal to said planar surface of said bracket and generally parallel to each other forming said stud-receiving cavity.

7. The electrical box assembly of claim 6, further comprising at least one tooth extending from one of said pair of flanges into said stud-receiving cavity opposite said at least one prong.

8. The electrical box assembly of claim 1, further comprising a drywall support extending from said enclosure opposite said bracket.

9. The electrical box assembly of claim 1, further comprising an alignment guide for guiding said stud into said stud-receiving cavity.

10. The electrical box assembly of claim 1, wherein said electrical enclosure comprises at least one of a single gang electrical outlet box, a multiple gang electrical outlet box or a low voltage outlet frame.

11. A support structure for mounting of an electrical enclosure to a stud comprising:
    a bracket extending from a first surface of an electrical enclosure, the bracket having a first generally planar surface;
    a flange extending from said bracket, said flange having a generally planar surface defining a portion of a stud receiving cavity; and
    a tab pivotally connected to said bracket and movable between a stud-receiving position wherein said tab is pivoted away from said cavity and a stud-securing position wherein said tab is pivoted toward said cavity such that said tab is substantially coplanar with the edge of said stud, and wherein said tab includes at least one prong that extends into said stud-receiving cavity for engaging said stud.

12. The support structure of claim 11, wherein said tab pivotally connected to said bracket is configured with a hinge for pivoting said tab with respect to said bracket.

13. The support structure of claim 11, wherein said tab is further configured with a locking member for locking said tab in said stud-securing position.

14. The support structure of claim 11, further comprising a second flange extending generally orthogonal to a planar surface of said bracket and forming said stud-receiving cavity.

15. The support structure of claim 14, further comprising at least one stiffener between said planar surface and said second flange to resist deflection of said flange with respect to said planar surface upon movement of said tab between said stud-receiving position and said stud-securing position.

16. The support structure of claim 14, wherein said flange and said second flange extend generally orthogonal to said planar surface of said bracket and generally parallel to each other forming the stud-receiving cavity.

17. The support structure of claim 16, further comprising at least one tooth extending from one of said flange and said second flange into said stud-receiving cavity opposite said at least one prong.

18. The support structure of claim 11, further comprising a drywall support extending from said enclosure opposite said bracket.

19. The support structure of claim 11, further comprising an alignment guide for guiding said stud into said stud-receiving cavity.

20. The support structure of claim 11, wherein said electrical enclosure comprises at least one of a single gang electrical outlet box, a multiple gang electrical outlet box or a low voltage outlet frame.

* * * * *